United States Patent
Pletka et al.

(10) Patent No.: US 11,314,595 B2
(45) Date of Patent: *Apr. 26, 2022

(54) ADAPTIVE DATA AND PARITY PLACEMENT USING COMPRESSION RATIOS OF STORAGE DEVICES

(71) Applicant: INTERNATIONAL BUSINESS MACHINES CORPORATION, Armonk, NY (US)

(72) Inventors: Roman Alexander Pletka, Uster (CH); Sasa Tomic, Kilchberg (CH); Timothy Fisher, Cypress, TX (US); Nikolaos Papandreou, Thalwil (CH); Nikolas Ioannou, Zurich (CH); Aaron Fry, Richmond, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/247,743

(22) Filed: Dec. 21, 2020

(65) Prior Publication Data

US 2021/0109811 A1 Apr. 15, 2021

Related U.S. Application Data

(63) Continuation of application No. 16/222,235, filed on Dec. 17, 2018, now Pat. No. 10,942,808.

(51) Int. Cl.
*G06F 11/00* (2006.01)
*G06F 11/10* (2006.01)
*G06F 3/06* (2006.01)

(52) U.S. Cl.
CPC ........ *G06F 11/1096* (2013.01); *G06F 3/0619* (2013.01); *G06F 3/0644* (2013.01); *G06F 3/0653* (2013.01); *G06F 3/0689* (2013.01)

(58) Field of Classification Search
CPC .. G06F 11/1096; G06F 3/0619; G06F 3/0644; G06F 3/0653; G06F 3/0689
(Continued)

(56) References Cited

U.S. PATENT DOCUMENTS 5,758,118 A 5/1998 Choy et al.
7,921,257 B1 4/2011 Kleiman et al.
(Continued)

FOREIGN PATENT DOCUMENTS

JP 2006338091 A 12/2006
WO 02061737 A2 8/2002

OTHER PUBLICATIONS

Tang et al., "DSUraid5 Data Layout Method for Heterogeneous Disk Array," Computer Engineering, v.34, n.14, Jul. 2008, pp. 277-27.

*Primary Examiner* — Christine T. Tu
(74) *Attorney, Agent, or Firm* — Griffiths & Seaton PLLC

(57) ABSTRACT

A RAID controller periodically collects an indication of a current compression ratio achieved by each of a plurality of storage devices within the RAID. The RAID controller determines a placement of data and the parity information within at least one of the plurality of storage devices according to at least one of a plurality of factors associated with the current compression ratio. The RAID controller writes the data and the parity information to the at least one of the plurality of storage devices according to the determined placement.

25 Claims, 12 Drawing Sheets

(58) Field of Classification Search
USPC .............. 714/800, 805, 769, 770, 771, 772;
707/825, 823, 821, 828; 711/714, 711,
711/170
See application file for complete search history.

(56) References Cited

U.S. PATENT DOCUMENTS

| | | |
|---|---|---|
| 7,937,421 B2 | 5/2011 | Mikesell et al. |
| 8,255,662 B2 | 8/2012 | Tsukada et al. |
| 8,943,513 B2 | 1/2015 | Ulrich et al. |
| 9,342,521 B2 * | 5/2016 | Isobe ...................... G06F 16/10 |
| 9,965,201 B1 | 5/2018 | Bono et al. |
| 10,942,808 B2 * | 3/2021 | Pletka ................... G06F 3/0619 |
| 2003/0145167 A1 | 7/2003 | Tomita |
| 2010/0257402 A1 | 10/2010 | Kurita |
| 2016/0041905 A1 * | 2/2016 | Turner ................ G06F 12/0802 |
| | | 711/3 |

* cited by examiner

ADAPTIVE DATA AND PARITY PLACEMENT USING COMPRESSION RATIOS OF STORAGE DEVICES

BACKGROUND OF THE INVENTION

Field of the Invention

The present invention relates in general computing systems, and more particularly to, various embodiments for adaptive storage of data and parity information within distributed computing storage components.

Description of the Related Art

A RAID (i.e., a Redundant Array of Independent Disks) is a storage technology that provides increased storage functions and reliability through redundancy. A RAID is created by combining multiple storage drive components (disk drives and/or solid state drives) into a logical unit. Data is then distributed across the drives using various techniques, referred to as "RAID levels." The standard RAID levels, which currently include RAID levels 1 through 6, are a basic set of RAID configurations that employ striping, mirroring, and/or parity to provide data redundancy. Each of the configurations provides a balance between two key goals: (1) increasing data reliability and (2) increasing Input/Output (I/O) performance.

To improve the I/O performance of a RAID and/or accelerate the rebuild process when a storage drive fails, techniques such as "wide striping" and "distributed spares" may be used. With wide striping, data is distributed more widely across a larger set of storage drives. This improves average I/O performance since data may be read from or written to a larger set of storage drives in parallel, thereby aggregating the I/O performance of each of the storage drives. Wide striping may also reduce the time required to rebuild a RAID in the event of a failure, since the data needed to rebuild the failed drive may be read in parallel from a larger set of storage drives.

With distributed spares, a small amount of storage space is reserved on each storage drive belonging to a distributed RAID. Collectively, this storage space may be substantially equivalent to the entire storage space of one physical spare storage drive. When a storage drive in the RAID fails, data may be rebuilt on the distributed spare instead of a physical spare storage drive. The distributed spare allows data to be rebuilt much more quickly since data may be written to many storage drives in parallel as opposed to a single physical storage drive. Once data from the failed storage drive is reconstructed on the distributed spare, the data may be copied to a single physical spare storage drive to free up the storage space on the distributed spare, thereby making it available for future drive failures.

In view of the foregoing, and as wide strides in technological advancement relating to data access devices accessing data in RAID appliances have been accomplished, there is an ever-growing demand for growth and development within the back end supporting systems that provide and store the data content.

SUMMARY OF THE INVENTION

In storage systems that perform compression below the RAID controller (i.e., within the storage devices themselves), each storage device (Hard Disk Drive (HDD), Solid State Drive (SSD), Flashcard, etc.) generally performs the data compression (and decompression) of the data stored therein independent from one another (i.e., each storage device performs compression/decompression operations on data stored therein independent of other storage devices in the array). This is typically a more scalable approach than performing compression above the RAID controller (i.e., prior to transferring the data to the storage devices) because significantly higher overall operational throughput can be achieved, while simultaneously building in the compression engine within hardware as a streaming engine to achieve very low latencies.

RAID schemes (or "levels") are used to protect data against sector errors and failures of entire devices. The RAID controller is typically implemented in the data storage system on top of the storage devices and organizes data into stripes that span all or a set of the attached storage devices within the array. In a RAID array with n storage devices, each stripe consists of n-p data blocks and p parity blocks, where for RAID-5, p=1 and RAID-6, p=2. Each of the uncompressed data and parity blocks (also called strips) that build a stripe have the same size. The strip and stripe size may be fixed or configurable at initialization time of the RAID array. Further, each strip of a stripe is stored on a different storage device such that the failure of one storage device only affects one strip in a stripe.

Parity information is computed using simple Exclusive-OR (XOR) operations, the addition and multiplication in a particular Galois field, or using Reed-Solomon error correction. Due to the increase in randomness in the parity information, parity data blocks are significantly less compressible (if at all) compared to the actual data blocks. Further, the compression ratio of the parity blocks reduces when the number of data blocks in a stripe n-p increases.

Typically, RAID controllers place (store in a particular location) data and parity of stripes following an implicit rule. For example, the parity location in a stripe s may be determined using a modulo operation, where the dividend is the stripe number s and the divisor is the number of the storage device n in the RAID array, and k a constant in the range [0, n−1], such that the storage device holding the parity is given by (s+k) mod n. Doing so ensures that each storage device will store an equal amount of parity data blocks.

Knowing that data blocks compress better than parity blocks and the compressibility of data depends on the entropy in the data, the compression ratio of each data and parity block written is not predictable. Therefore, the RAID array may run out of space because the physical space of a single storage device is exceeded while a large amount of storage space on other storage devices in the array may still be unused. Traditional approaches try to contain compressed sizes of blocks within a predefined range, such that the portions of data within the predefined size range are then stored in the actual volume whereas the portion of data exceeding the range is stored in a separate virtual volume. This splitting of data blocks leads to reduced performance because additional I/O operations need to be performed to access data and results in a high metadata overhead.

Accordingly and in view of the foregoing, various embodiments for adaptive placement of parity information within RAID stripes, by a processor or hardware controller, are provided. In one embodiment, by way of example only, a method comprises periodically collecting, by a RAID controller, an indication of a current compression ratio achieved by each of a plurality of storage devices within the RAID; determining, by the RAID controller, a placement of data and the parity information within at least one of the plurality of storage devices according to at least one of a plurality of factors associated with the current compression ratio; and writing the data and the parity information by the RAID controller to the at least one of the plurality of storage devices according to the determined placement.

That is, a method is proposed to balance storage utilization in RAID-organized storage systems with internal data compression, by favoring the placement of parity data on the one or more storage devices with the lowest (or a low) amount of physical space currently used with respect to the other storage devices in the system. The RAID controller queries each storage device periodically to report its physical space utilization, and adapts the parity placement according to the recently reported physical space utilization of each storage device. Depending on the desired configuration and the imbalance of the physical space used, the RAID controller can be more or less aggressive in its determination of placing parity information onto devices with low physical utilization according to a plurality of schemas, disclosed herein.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
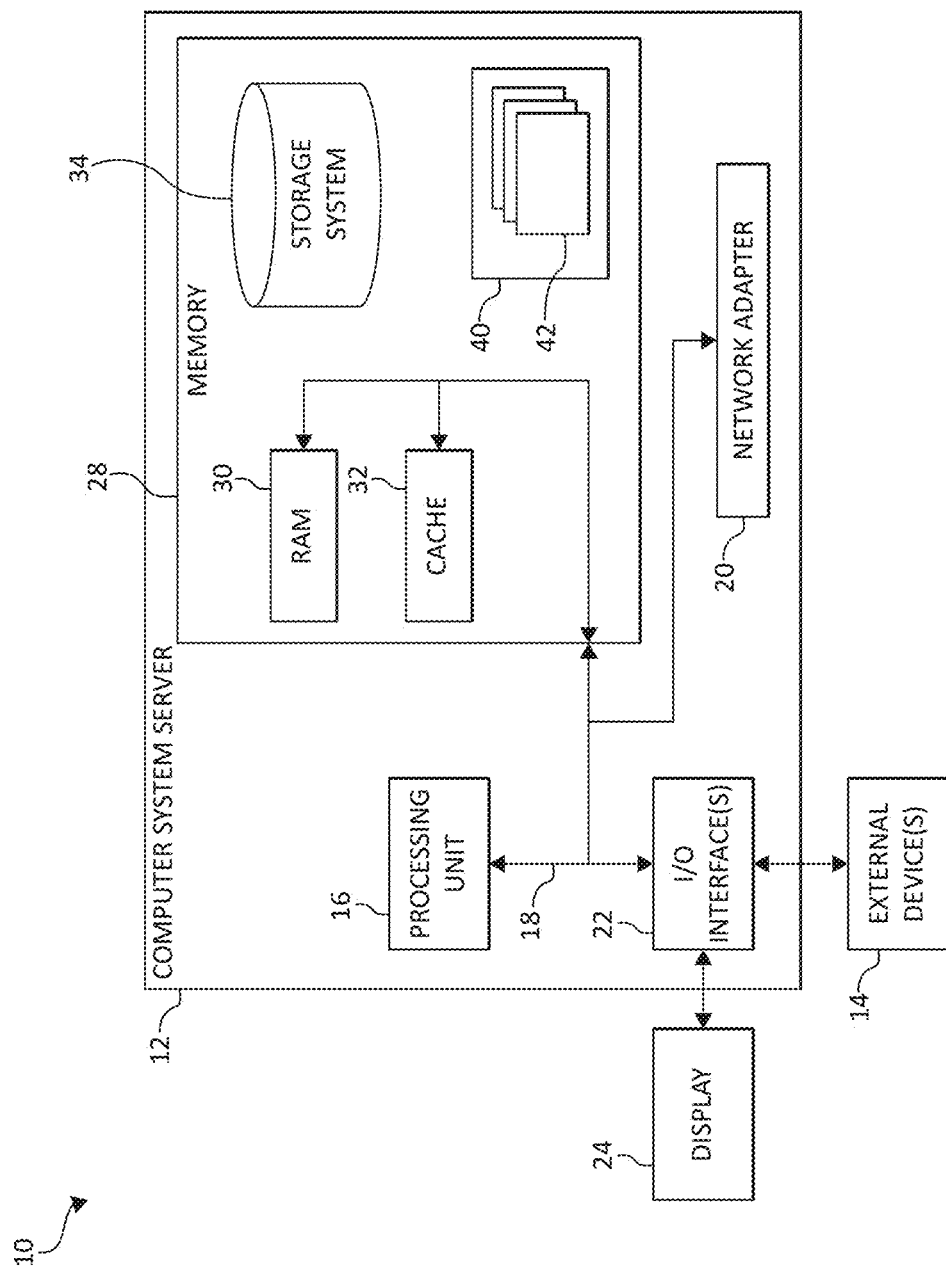
FIG. 1 is a block diagram depicting an exemplary cloud computing node, according to embodiments of the present invention.

As mentioned, embodiments are considered herein to balance storage utilization in RAID-organized storage systems with internal data compression, by favoring the placement of parity data on the one or more storage devices with the lowest (or a low) amount of physical space currently used with respect to the other storage devices in the system. The RAID controller queries each storage device periodically to report its physical space utilization, and adapts the parity placement according to the recently reported physical space utilization of each storage device. Depending on the desired configuration and the imbalance of the physical space used, the RAID controller can be more or less aggressive in its determination of placing parity information onto devices with low physical utilization according to various techniques.

Unlike the implicit placement in prior art, there are several options when the decision of the parity placement can be taken. First is to perform the parity placement according to the currently selected parity placement scheme upon normal write operations. Second is to perform the parity placement upon RAID rebuild with a distributed spare. Third is to define and apply one or more parity placement schemes in the background for the entire RAID array. Fourth is to define and apply one or more parity placement schemes selectively in the background for a given Logical Block Address (LBA) range or volume maintained by the RAID controller. Fifth is to define and apply one or more parity placement schemes only when writing to currently unmapped regions. Any combination or all of these options may be implemented to achieve a higher throughput and high utilization across each storage device of the array.

It is understood in advance that although this disclosure includes a detailed description on cloud computing, implementation of the teachings recited herein are not limited to a cloud computing environment. Rather, embodiments of the present invention are capable of being implemented in conjunction with any other type of computing or storage environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive" or "solid-state drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
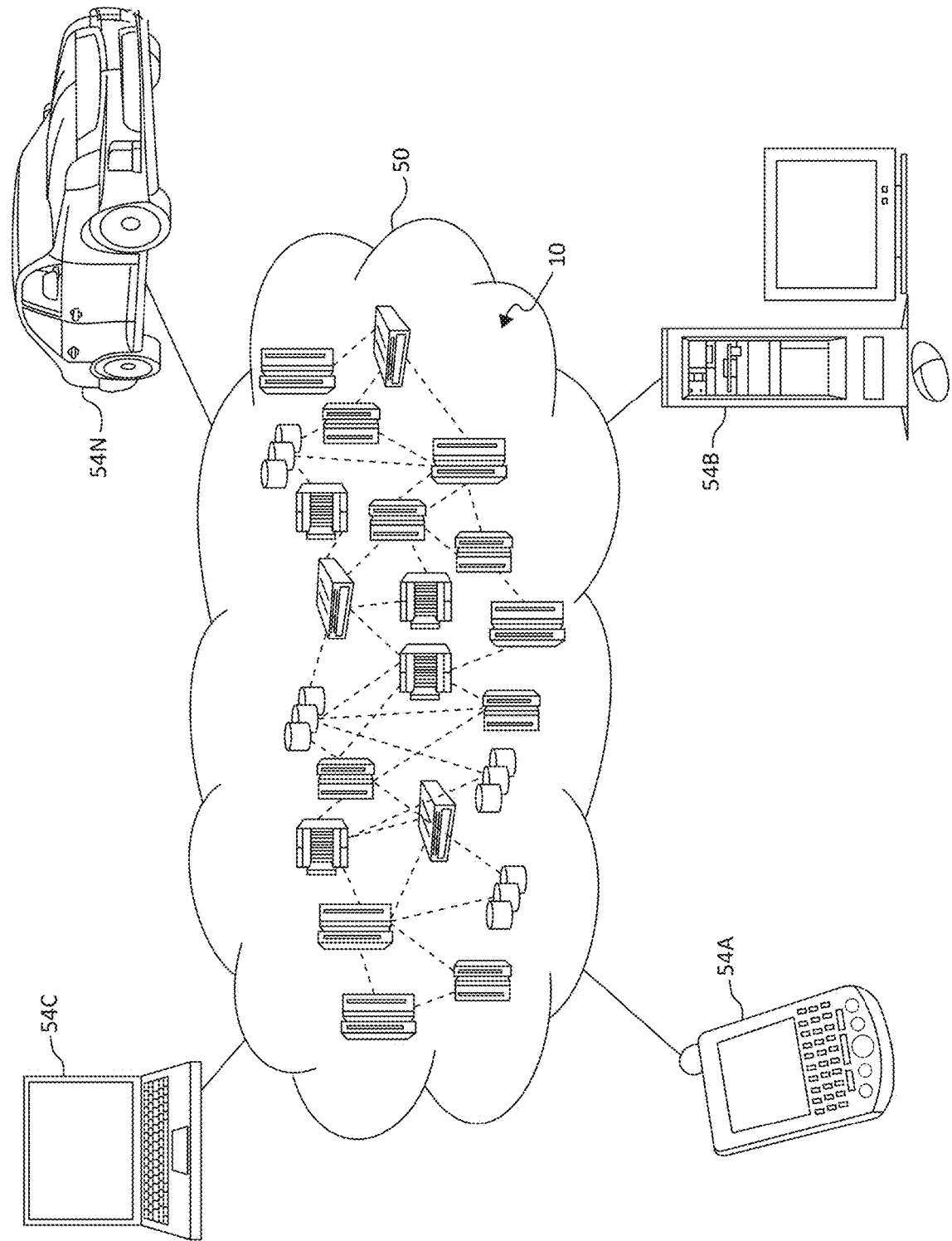
FIG. 2 is a block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
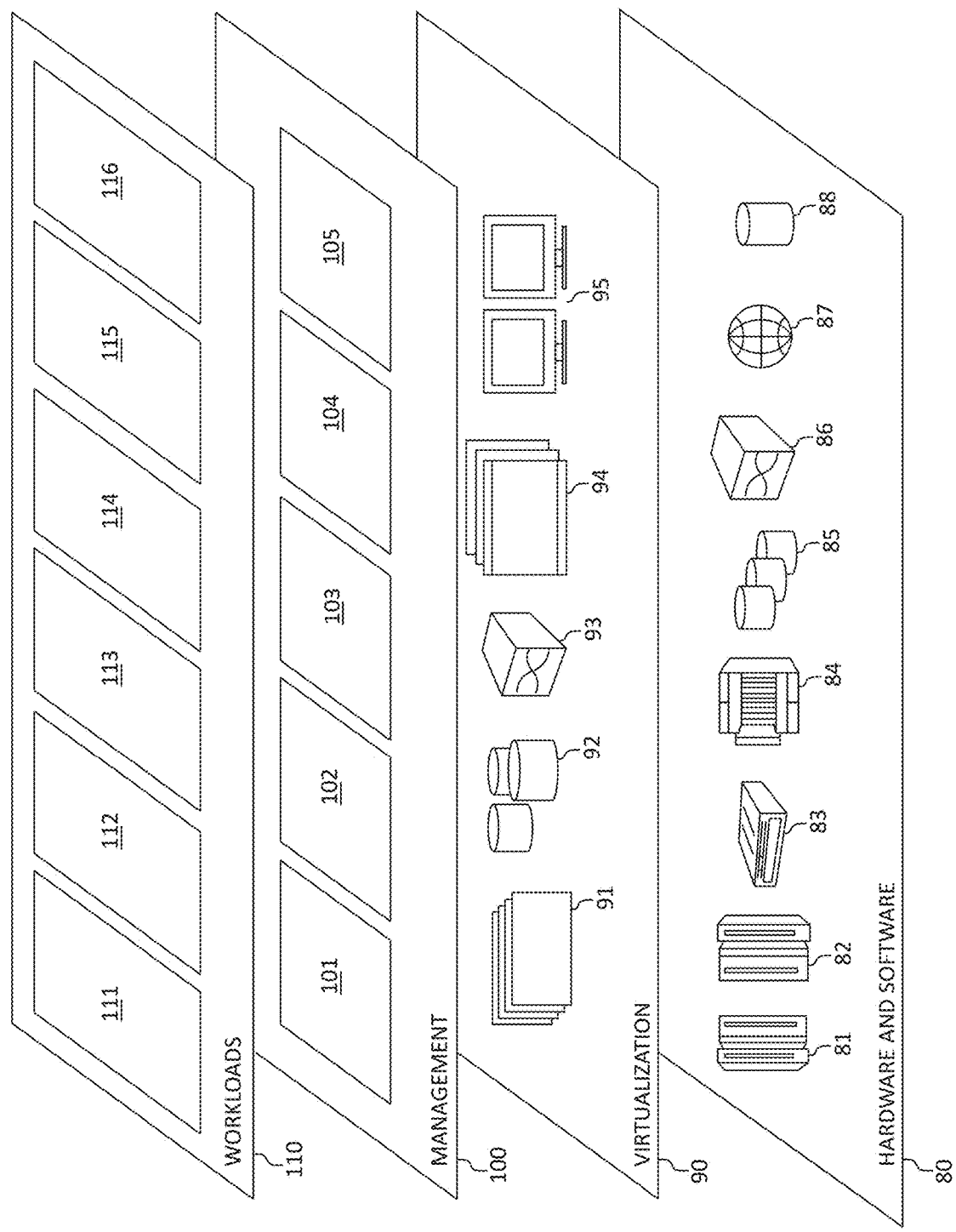
FIG. 3 is a block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various data security workloads and functions 95, such as antivirus scanning workloads, or anti-malware scanning workloads. In addition, data security workloads and functions 95 may include such operations as data quarantining and/or data deleting functions. One of ordinary skill in the art will appreciate that the data security workloads and functions 95 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
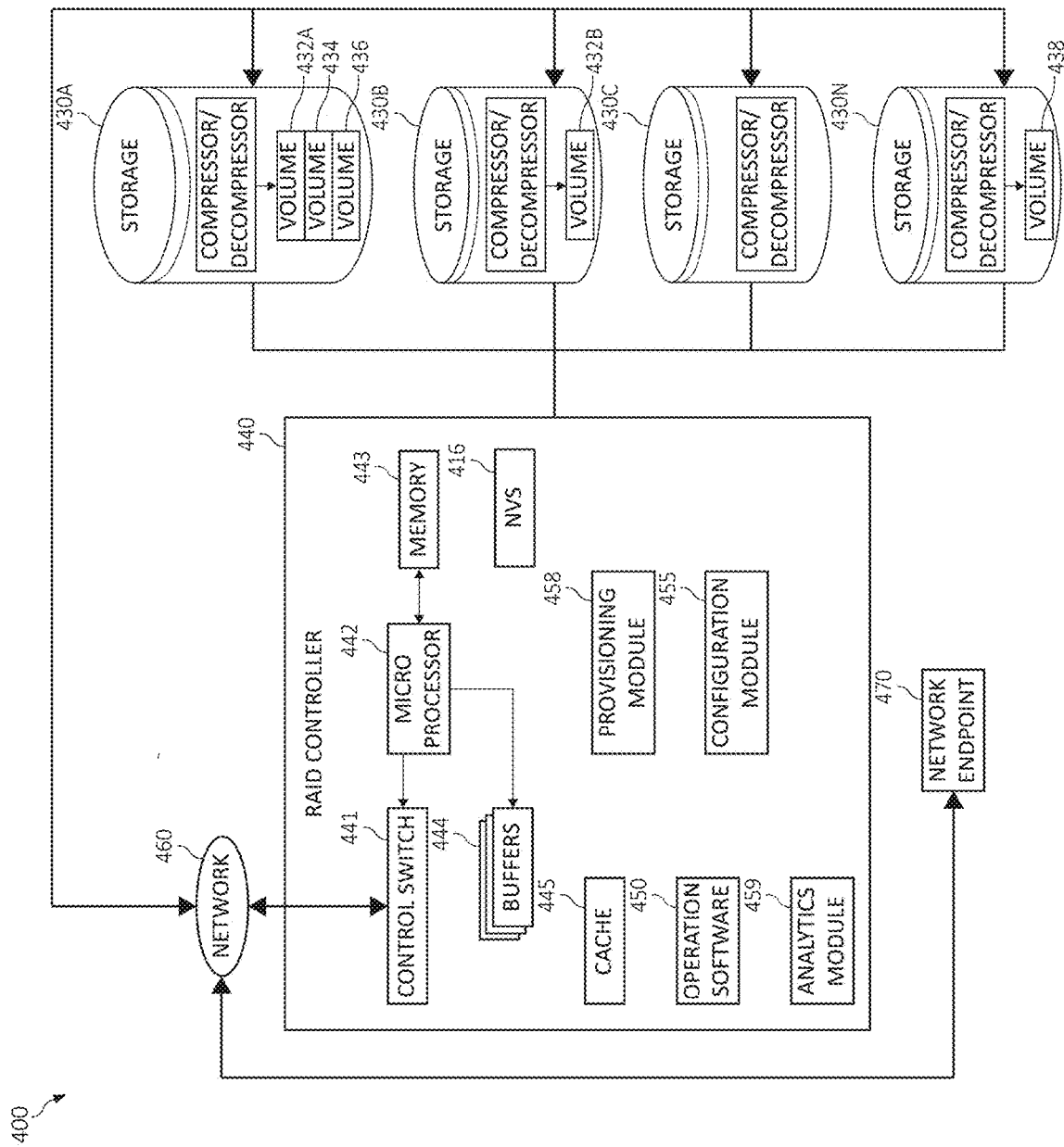
FIG. 4 is a block diagram depicting an exemplary hardware structure of a computing storage system, according to embodiments of the present invention.

FIG. 4, following, is an additional block diagram showing a hardware structure of a data storage system 400 that may be used in the overall context (i.e., as a portion of a distributed computing environment) of performing functionality according to various aspects of the present invention.

Network 460 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e. the Internet), private, or any combination thereof. The ISP may provide local or distributed data among one or more locations and may be equipped with any type of fabric (or fabric channel) (not shown in FIG. 4) or network adapter 460 to the RAID controller 440 (i.e., storage controller), such as Fibre channel, FICON, ESCON, Ethernet, fiber optic, wireless, or coaxial adapters. Data storage system 400 is accordingly equipped with a suitable fabric (not shown in FIG. 4) or network adaptor to communicate.

To facilitate a clearer understanding of the methods described herein, RAID controller 440 is shown in FIG. 4 as a single processing unit, including a microprocessor 442, system memory 443 and nonvolatile storage ("NVS") 416. It is noted that in some embodiments, RAID controller 440 is comprised of multiple processing units, each with their own processor complex and system memory, and interconnected by a dedicated network 460 within data storage system 400.

In a local or remote location, yet connected over network 460, storage 430 (labeled as storage devices 430A, 430B, 430C and 430N herein) may be comprised of one or more storage devices, such as storage arrays, which are connected to RAID controller 440 (e.g., by a storage network) as shown. Each of the storage devices of the storage 430 may include built in compression/decompression engines to facilitate compression/decompression operations performed on data respectively stored therein.

In some embodiments, the devices included in storage 430 may be connected in a loop architecture. RAID controller 440 manages storage 430 and facilitates the processing of write and read requests intended for storage 430. The system memory 443 of RAID controller 440 stores program instructions and data, which the processor 442 may access for executing functions and method steps of the present invention for executing and managing storage 430 as described herein. In one embodiment, system memory 443 includes, is in association with, or is in communication with the operation software 450 for performing methods and operations described herein. As shown in FIG. 4, system memory 443 may also include or be in communication with a cache 445 for storage 430, also referred to herein as a "cache memory," for buffering "write data" and "read data," which respectively refer to write/read requests and their associated data. In one embodiment, cache 445 is allocated in a device external to system memory 443, yet remains accessible by microprocessor 442 and may serve to provide additional security against data loss, in addition to carrying out the operations as described herein.

In some embodiments, cache 445 is implemented with a volatile memory and non-volatile memory and coupled to microprocessor 442 via a local bus (not shown in FIG. 4) for enhanced performance of data storage system 400. The NVS 416 included in data RAID controller 440 is accessible by microprocessor 442 and serves to provide additional support for operations and execution of the present invention as described in other figures. The NVS 416, may also be referred to as a "persistent" cache, or "cache memory" and is implemented with nonvolatile memory that may or may not utilize external power to retain data stored therein. The NVS 416 may be stored in and with the cache 445 for any purposes suited to accomplish the objectives of the present invention. In some embodiments, a backup power source (not shown in FIG. 4), such as a battery, supplies NVS 416 with sufficient power to retain the data stored therein in case of power loss to data storage system 400. In certain embodiments, the capacity of NVS 416 is less than or equal to the total capacity of cache 445.

Storage 430 may be physically comprised of one or more storage devices, such as storage arrays. A storage array is a logical grouping of individual storage devices, such as a HDD, SSD, and/or flash memory. In certain embodiments, storage 430 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 4 may include a logical volume, or simply "volume," may have different kinds of allocations. Storage 430a, 430b and 430n are shown as ranks in data storage system 400, and are referred to herein as rank 430a, 430b and 430n. Ranks may be local to data storage system 400, or may be located at a physically remote location. In other words, a local RAID controller may connect with a remote RAID controller and manage storage at the remote location. Rank 430a is shown configured with two entire volumes, 434 and 436, as well as one partial volume 432A. Rank 430B is shown with another partial volume 432B. Thus volume 432 is allocated across ranks 430A and 430B. Rank 430N is shown as being fully allocated to volume 438—that is, rank 430N refers to the entire physical storage for volume 438. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

A network endpoint 470 is connected through the network 460 as shown. The network endpoint 470 is generically intended to refer to any number of network devices, such as a switch, a router, a wireless access point, or another device known generally to one of ordinary skill in the art. As will be further illustrated in the following figures, a user may use a networked device, (e.g., a device connected to network 460) to access the network 460. The networked device may include computers, tablets, smartphones, television set top boxes, televisions and other video equipment, or even a household appliance such as a refrigerator or a garage door opener, again as one of ordinary skill in the art will appreciate. Ultimately any device having communicative ability to and through network 460 is anticipated to use the network endpoint 470. In one embodiment, the depiction of a network endpoint 470 serves to provide a point where an input object (data object) is introduced into a distributed computing environment, as will be described.

The RAID controller 440 may include a configuration module 455 and a provisioning module 458, among other functional components. The configuration module 455 and provisioning module 458 may operate in conjunction with each and every component of the RAID controller 440, and storage devices 430. The configuration module 455 and provisioning module 458 may be structurally one complete module or may be associated and/or included with other individual modules. The configuration module 455 and provisioning module 458 may also be located at least partially in the cache 445 or other components, as one of ordinary skill in the art will appreciate.

The configuration module 455 and provisioning module 458 may individually and/or collectively perform various aspects of the present invention as will be further described. For example, the configuration module 455 may perform various system configuration operations in accordance with aspects of the illustrated embodiments, such as configuring the RAID controller 440 to operate using a given set of definitional information, for example. The analytics module 459 may use data analytics to compute, identify, organize, create, delete, sequester, or perform other actions on various patterns, trends, and other characteristics identified in the data over the network 460 and between other distributed computing components in a distributed computing environment. As one of ordinary skill in the art will appreciate, the configuration module 455, provisioning module 458, and analytics module 459 may make up only a subset of various functional and/or functionally responsible entities in the data storage system 400.

Other ancillary hardware may be associated with the storage system 400. For example, as shown, the RAID controller 440 includes a control switch 441, a microprocessor 442 for controlling all the RAID controller 440, a nonvolatile control memory 443 for storing a microprogram (operation software) 250 for controlling the operation of RAID controller 440, data for control, cache 445 for temporarily storing (buffering) data, and buffers 444 for assisting the cache 445 to read and write data, a control switch 441 for controlling a protocol to control data transfer to or from the storage devices 430, the configuration module 455, provisioning module 458, or other blocks of functionality, in which information may be set. Multiple buffers 444 may be implemented with the present invention to assist with the operations as described herein.

Figure 5:
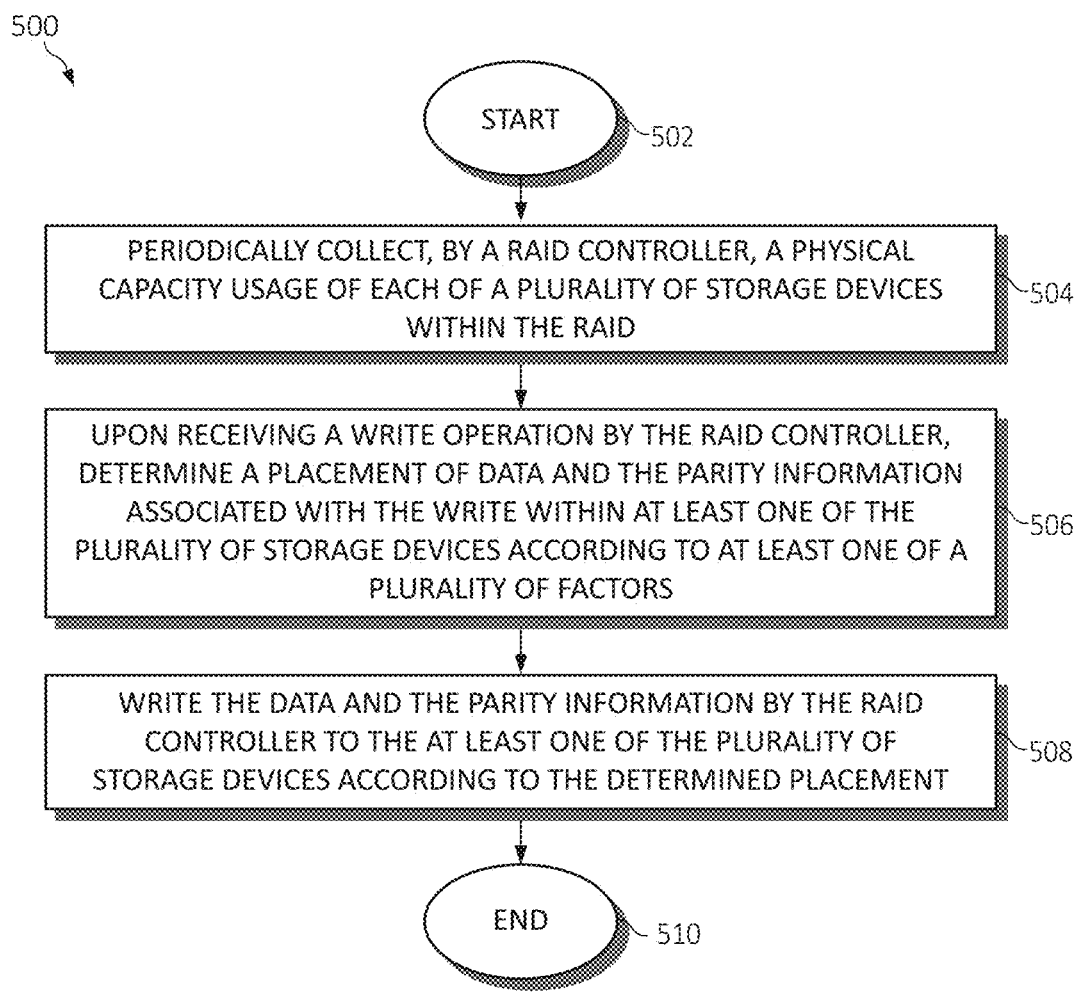
FIG. 5 is a flow chart diagram illustrating an exemplary method for adaptive placement of parity information within RAID stripes, according to embodiments of the present invention.

Continuing, FIG. 5 illustrates a method 500 for adaptive placement of parity information within RAID stripes, in accordance with one embodiment of the present invention. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

The method 500 begins (step 502) by periodically collecting, by a RAID controller, a physical capacity usage of each of a plurality of storage devices within the RAID (step 504). The RAID controller may then determine a placement of (a particular location(s) to store) data and the parity information within at least one of the plurality of storage devices according to at least one of a plurality of factors associated with the physical capacity usage (step 506). The data and the parity information are then written by the RAID controller to the at least one of the plurality of storage devices according to the determined placement (step 508). The method 500 ends (step 510).

Specifically, in conjunction with the functionality of the method 500, it has been observed that data blocks generally compress more efficiently than parity blocks (i.e., achieve a higher compression ratio), and that storage devices themselves may be easily extended to report the current physical capacity usage of data stored therein. For example, vendor specific SMART extensions could be used to periodically query the actual storage capacity used in each storage device.

Thus, knowing that the storage devices perform compression independently and that data blocks generally compress more efficiently than parity blocks, this information can be utilized to improve overall capacity usage of the storage system by changing the way how data and parity are distributed on the storage devices by favoring the placement of parity data on the one or more storage devices with the lowest (or a low) amount of physical space currently used with respect to the other storage devices in the system.

Figure 6:
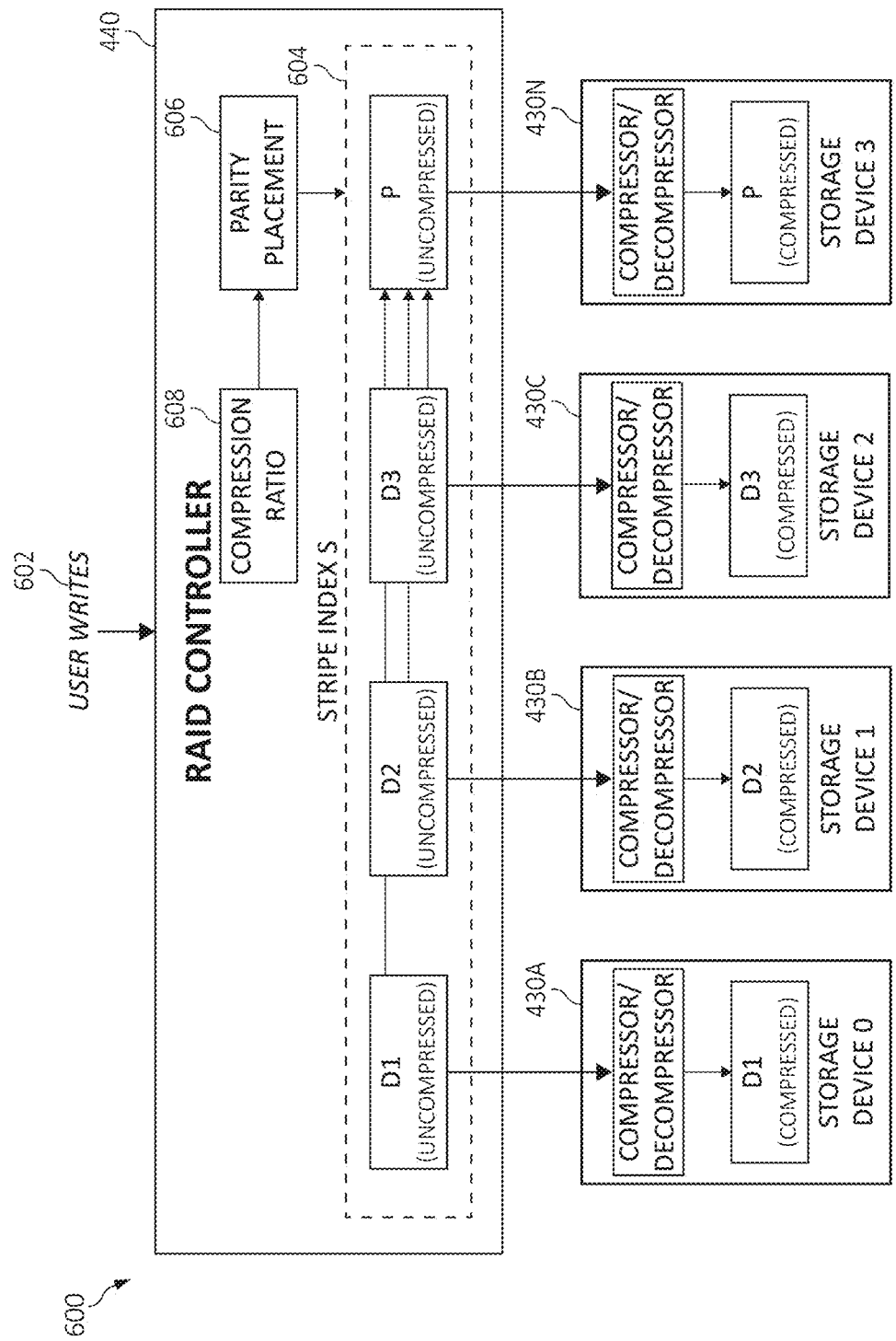
FIG. 6 is an additional block diagram depicting the exemplary hardware structure of the computing storage system, according to embodiments of the present invention.

Turning now to FIG. 6, an additional block diagram 600 depicting portions of the data storage system 400 including an overview of the functions of the RAID controller 440 in communication with storage devices 430A-n storing an exemplary RAID stripe s is illustrated. More particularly, the diagram 600 illustrates an overview of the data storage system 400 storing the RAID stripe with an index s based on overall compression ratios $c_i$ 608 reported by each storage device 430A-N. The parity placement function in the RAID controller 440 may be of any type (implicit or explicit). The RAID controller 440 may receive user write(s) 602 which are assembled into stripes across the storage devices 430A-N. Diagram 600 illustrates an index of a stripe s having uncompressed data labeled D1, D2, D3, and parity information P at a particular placement 606.

Figure 7:
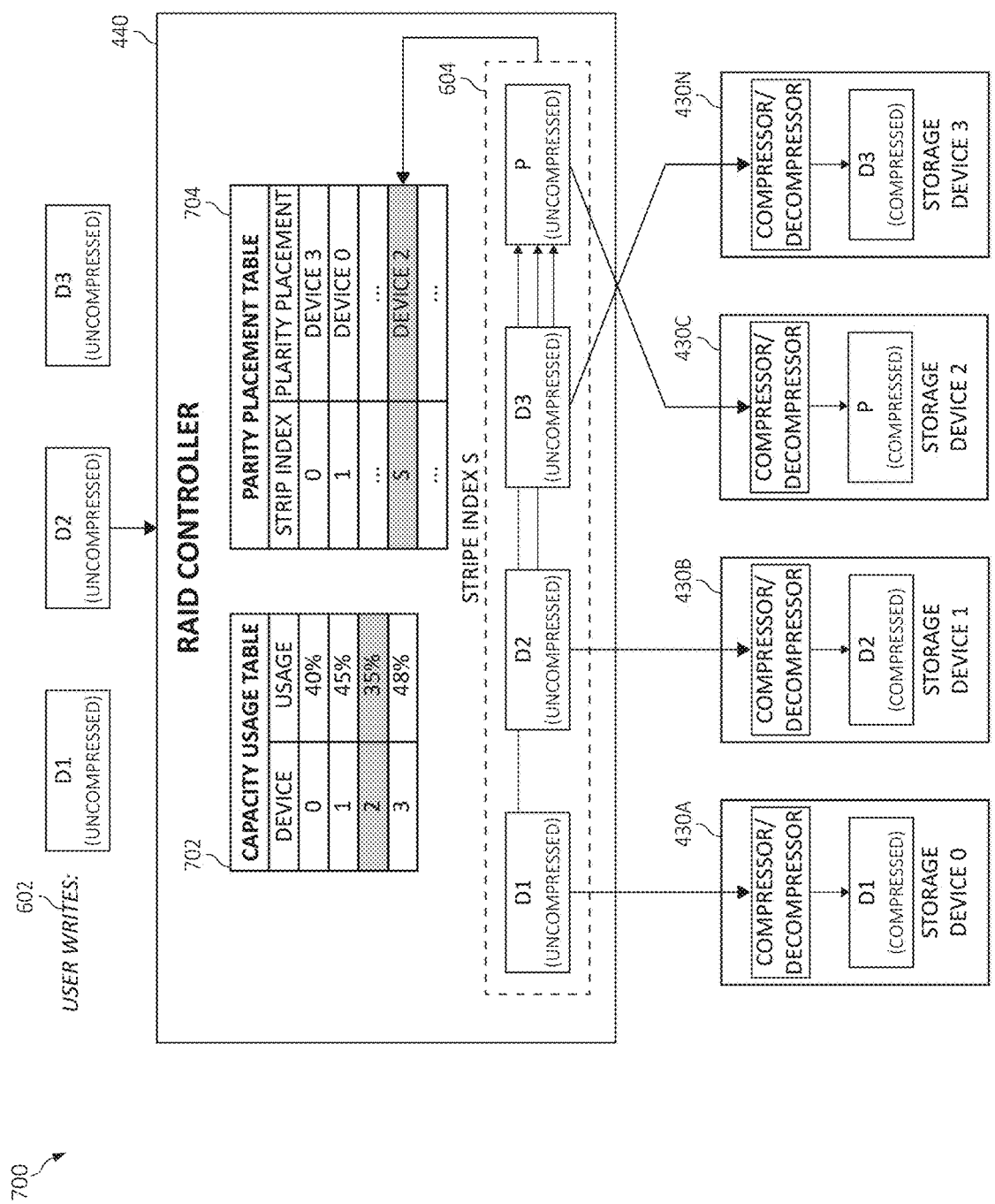
FIG. 7 is an additional block diagram depicting the exemplary hardware structure of the computing storage system including a per-stripe parity information placement example, according to embodiments of the present invention.

FIG. 7 is an additional block diagram 700 depicting portions of the data storage system 400 including a per-stripe parity information placement example. In a first embodiment, the RAID controller 440 maintains explicit parity placement information 606 for each stripe. As illustrated in diagram 700, the RAID controller may additionally maintain a capacity usage table 702 recording the physical capacity used by each storage device 430A-N and a parity placement table 704 indicating the parity location of each stripe. Alternatively, the RAID controller may maintain a table of overall compression ratios $c_i$ of the storage devices 430A-N instead of the capacity usage table 702. Upon write of a new stripe (here, data blocks D1, D2, and D3 of user write(s) 602), the RAID controller 440 uses the information in the capacity usage table 702 to determine the placement of the parity and updates this information in the parity placement table 704. Additional information could also be used in determining the parity placement, such as the number of parity strips stored in each storage device 430A-N, parity location of other stripes, etc. In diagram 700, the parity strip is placed on storage device 2 (storage device 430C) having the lowest capacity usage according to the capacity usage table 702. The data strips are placed in a round robin fashion implicitly defined by the parity location.

Figure 8:
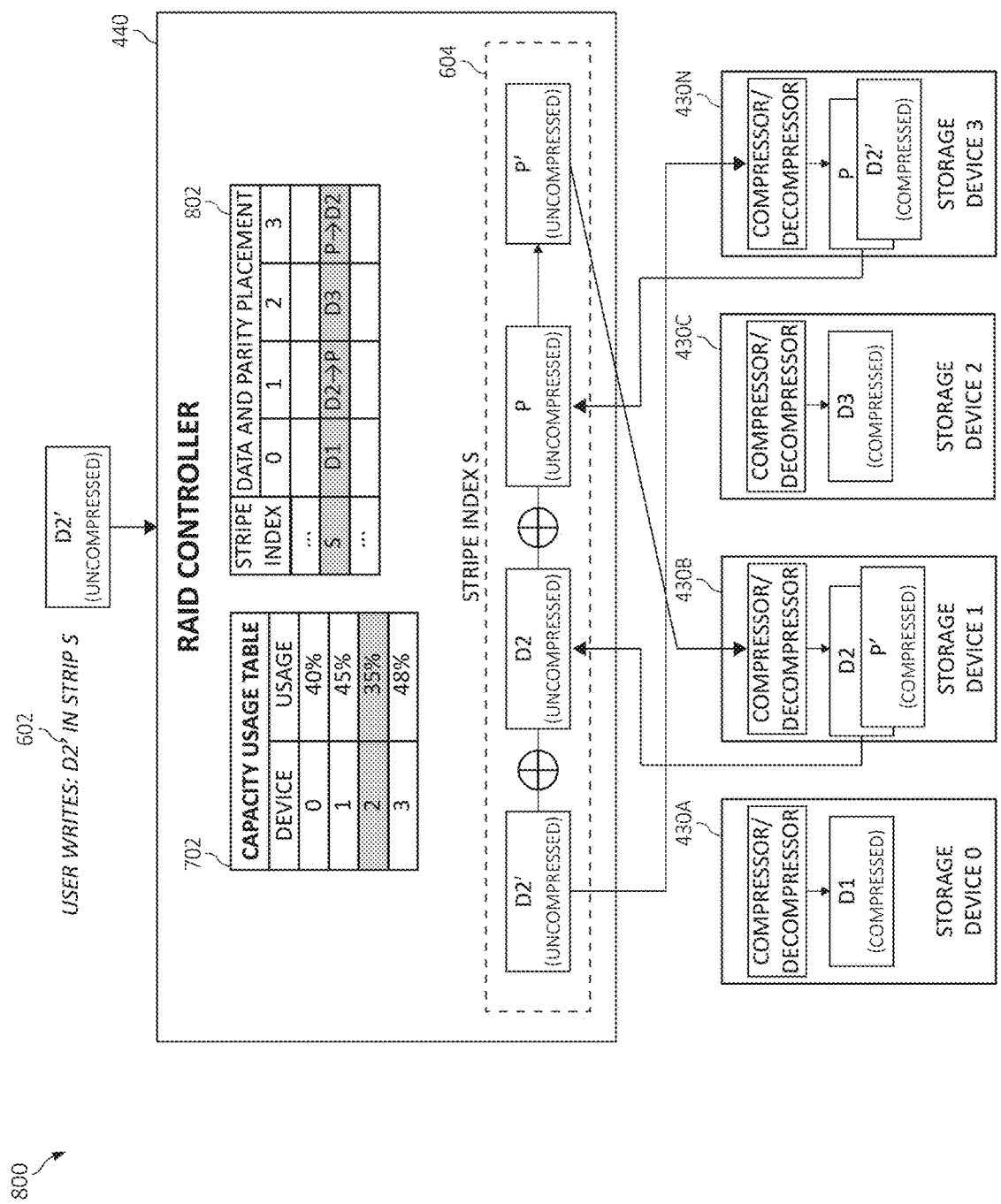
FIG. 8 is an additional block diagram depicting the exemplary hardware structure of the computing storage system including an explicit per-stripe data and parity information placement scheme, according to embodiments of the present invention.

Referring now to FIG. 8, an additional block diagram 800 depicting portions of the data storage system 400 including an explicit per-stripe data and parity information placement scheme is illustrated. In this embodiment, the RAID controller 440 may further maintain the location of each data block in a stripe such that the data placement is no longer implicitly defined by the parity location, but explicitly defined in a form of a table (i.e., the data and parity placement table 802). This provides the advantage that the parity placement can be updated even on small host writes with no additional overhead in terms of read and write operations to the storage devices 430A-n. Diagram 800 illustrates a small write update in stripe s consisting of data blocks D1, D2, and D3, where only data block D2 is overwritten with data D2' from the user write(s) 602. Based on the capacity usage table 702, the RAID controller 440 may make the decision to swap the parity and data locations of stripe s, thus writing the new data D2' to storage device 3 (storage device 430N), where old parity P was stored previously, and the new parity P' to storage device 1 (storage device 430B), where D2 was stored previous to the swap. The RAID controller 440 then updates the data and parity placement table 802 correspondingly.

It should be noted that in case the strip size is very small (e.g., 4 Kilobytes (KB)), the amount of parity placement metadata may be prohibitively large. For example, in an array of 17 storage devices using RAID-5, each storage device storing 20 Terabytes (TB) using a parity placement table having 1 Byte entries per stripe and a strip size of 4 KB, the RAID controller 440 would need more than 5 Gigabytes (GB) for the first embodiment (depicted in diagram 700) to store the parity placement table 704. For the second embodiment, almost 90 GB would be needed as every entry in the data and parity placement table needs one Byte per storage device. Therefore, other embodiments that can significantly reduce the metadata overhead are typically preferred.

In another embodiment, the granularity of parity and data placement may be enlarged by the RAID controller 440. For example, using a stripe size of 1 GB (i.e., a strip size of 64 (Megabytes (MB)) significantly reduces the amount of metadata for the second example to 5 MB. Therefore, the RAID controller may adjust the granularity of the stripe size to a predefined size which most efficiently allocates storage for the parity information metadata.

In yet other embodiments, the amount of metadata stored may be further reduced by using a set of parity placement schemes that implicitly define the parity placement while concurrently adding some bias to the placement of the parity. Each of the parity placement schemes can, to different extents, favor particular storage devices 430A-N for placing parity information. At least one parity placement scheme should place parity information blocks equally as being distributed over all storage devices 430A-N within a given LBA range of stripe indexes. When using parity placement schemes, only the index of the parity placement scheme used for each stripe, or preferably ranges of stripes, must be maintained by the RAID controller 440.

Full and Partial Stripe Writes

Upon receiving normal writes, two cases can be distinguished: (1) when a full stripe write is performed, all data is available at the RAID controller 440 and the parity computation can be performed without reading additional data from any of the storage devices 430A-N. Thus, the location of the old parity in the stripe does not influence the write process and data, and the parity information can be freely placed within respective storage device(s) 430A-N without causing additional read/write operations (see diagram 700). Upon receiving a partial stripe write, only a subset of the data strips is overwritten. This requires reading old data and old parity information for calculating the new parity information. When data and parity information can be freely placed in the stripe, no additional read/write operations are needed (see diagram 800).

It should further be noted that, when only the parity location is stored, and the data location is implicitly defined by the parity location, additional read/write operations may be required on partial stripe writes.

Figure 9:
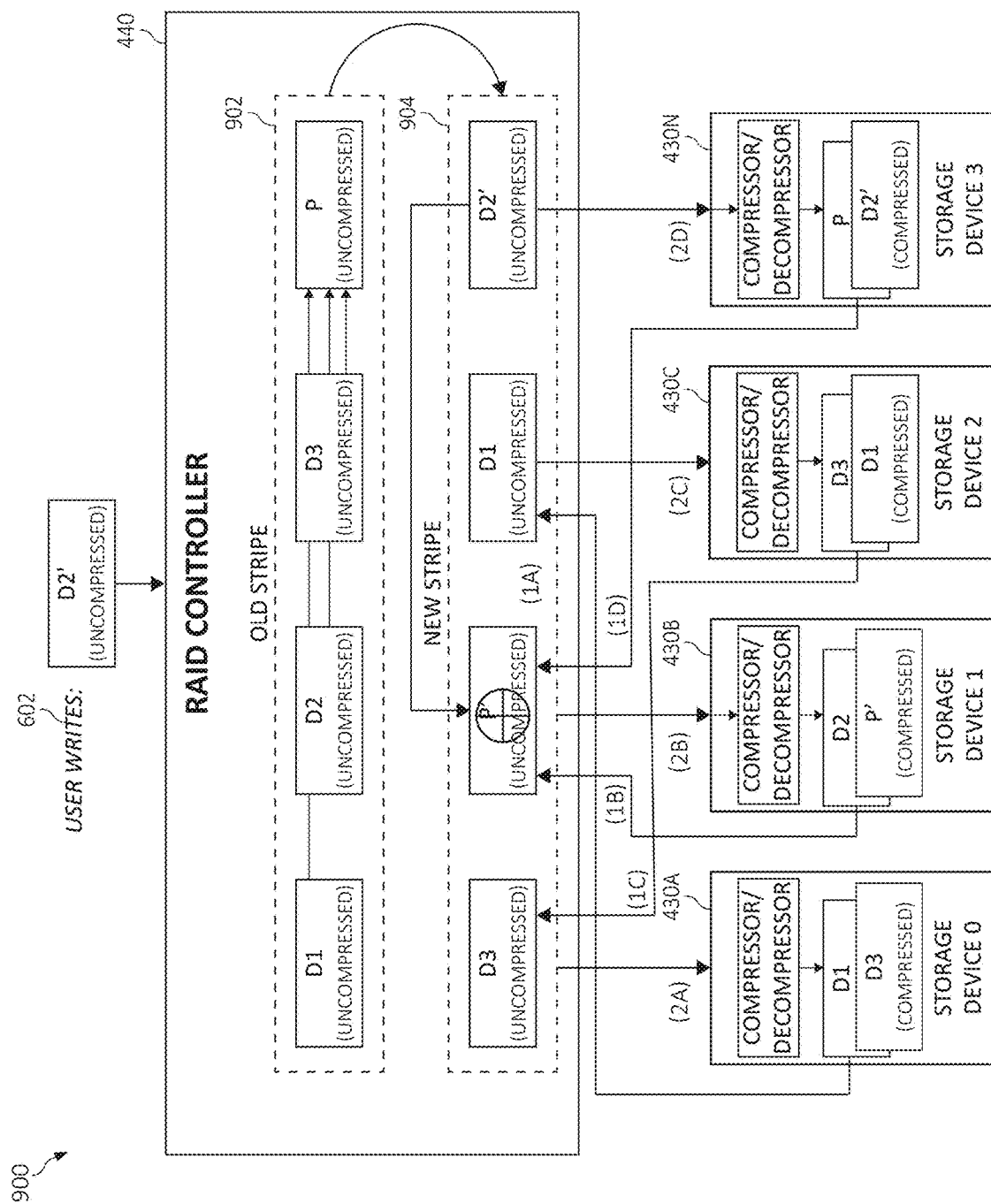
FIG. 9 is an additional block diagram depicting the exemplary hardware structure of the computing storage system including an example of a partial stripe write and relocation of the parity information, according to embodiments of the present invention.

Referring now to FIG. 9, an additional block diagram 900 depicting portions of the data storage system 400 is illustrated, including an example of a partial stripe write with relocation of parity information when the location of the data strips is implicitly defined. That is, diagram 900 illustrates the case of a partial stripe write where the RAID controller 440 only maintains the parity location and data location is implicitly defined. As the RAID controller decided to change the parity location from a previous (old) stripe 902 during creation of a new stripe 904, the implicit data placement also requires relocating still valid data in the stripe. Hence, besides reading the old parity information P (step 1D) and old data D2 (step 1B), the unmodified data strips D1 and D3 are additionally read (steps 1A and 1C) and written to new locations (steps 2A and 2C). The new data D2' is written to storage device 3 (storage device 430N in step 2D) and the new parity information P' is written to storage device 1 (storage device 430B in step 2B). Further, data D1 is written to storage device 2 (storage device 430C in step 2C) and data D3 is written to storage device 0 (storage device 430A in step 2A). While this process is performable, it is preferably avoided unless certain conditions are met. Therefore, with implicit data placement, adaptive parity information and data placement may only be used on full stripe writes or when all logical strips in the stripe have been trimmed before writing.

Parity Information Placement Schemes

Implicit parity information placement significantly reduces the amount of metadata that must be maintained by the RAID controller 440. A commonly used implicit parity information placement scheme has been introduced previously, where the parity information is placed in a round-robin fashion among all storage devices 430A-N in the RAID array using the function: (s+k) mod n.

Together with the implicit placement of the parity information, the storage location of data is typically also implicitly defined. Data strips are placed in a round robin fashion where the placement of the first data strip directly follows the location of the parity strip. Next is discussed alternative implicit parity information placement schemes that may be used within similar context.

One example of a parity information placement scheme, where i denotes the index of storage device 430A-n having the highest compression ratio $c_i$ (and hence the lowest physical space utilization) and w denotes a weighting factor favoring storage device i, comprises:

If s mod w==0:
  parity information is placed on storage device ((s+k) div w) mod n, else
  parity information is placed on storage device i, where $c_i <= c_j \forall j \in [0, n-1]$.

This, therefore favors storage device i for storing the parity information; and using this parity placement scheme only requires maintaining the index i for a range of stripes.

Similarly, another parity placement scheme may skip the placement of parity on a storage device i with a low compression ratio such that parity is placed on the storage device as follows:

If (s+k) mod (n−1)<i:
   parity is placed on storage device (s+k) mod (n−1),
else
   parity is placed on storage device ((s+k) mod (n−1))+1.

This effectively skips storage device i, therefore favoring other storage devices 430A-N having a known higher compression ratio. Other parity information placement schemes that do not require storage of the parity location per stripe may additionally be considered.

Summary of Parameters:
s stripe index
n number of storage devices in the RAID array
k a constant in the range [0, n−1]
w weighting factor (positive integer)
i index of the selected storage device for skipping or extra parity placements
$c_j$ Compression ratio on storage device j Adaptive Parity Information and Data Placement with Distributed Spare In another embodiment, adaptive parity information and data placement may only be performed upon a RAID rebuild of a storage device 430A-N, where the storage device is a spare device distributed over all storage devices 430A-N.

As each storage device 430A-N has some space left unused to accommodate the distributed spare, the imbalance of the actual physical space used among the storage devices 430A-N is typically acceptable when the default round-robin parity data placement scheme is used.

Figure 10A:
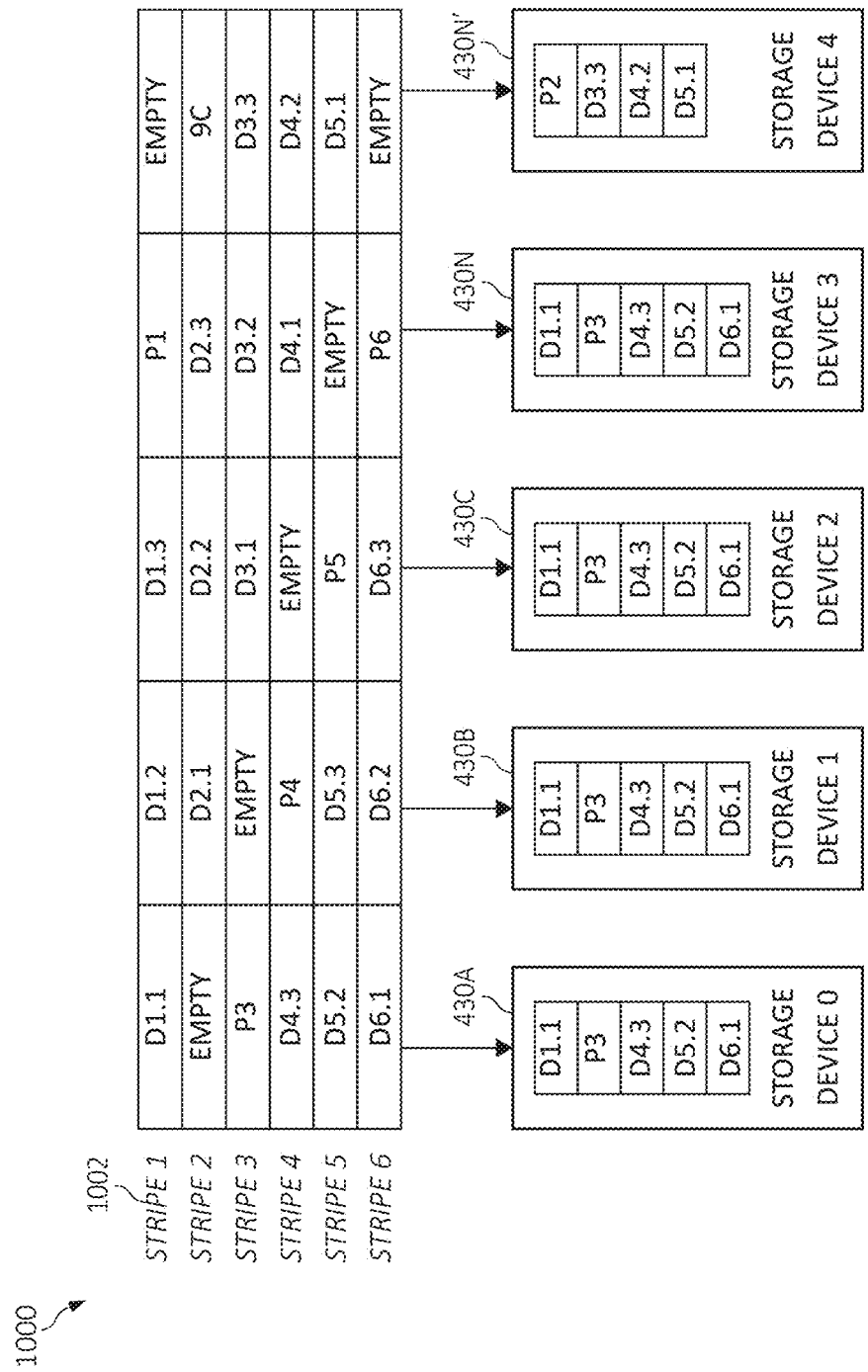
FIGS. 10A-10C are additional block diagrams depicting the exemplary hardware structure of the computing storage system in a RAID-5 configuration having a distributed spare used for data and parity information placement upon performing a RAID rebuild operation, according to embodiments of the present invention.

FIG. 10A illustrates a sample RAID configuration 1000 with five storage devices used in a RAID-5 configuration and a distributed spare. RAID configuration 1000 includes the storage devices 430A-N and includes an additional storage device 430N' as the fifth storage device of the array. The RAID configuration 1000 further depicts the logical organization of data and parity strips, which defines a mapping 1002 of strips to storage devices 430A-N', and the actual compressed strips stored in each storage device 430A-N'. In this instance, a simple round-robin parity placement scheme is used. Thus, the actual physical capacity used to store all stripes is imbalanced due to the different compression ratios of each strip.

Figure 10B:
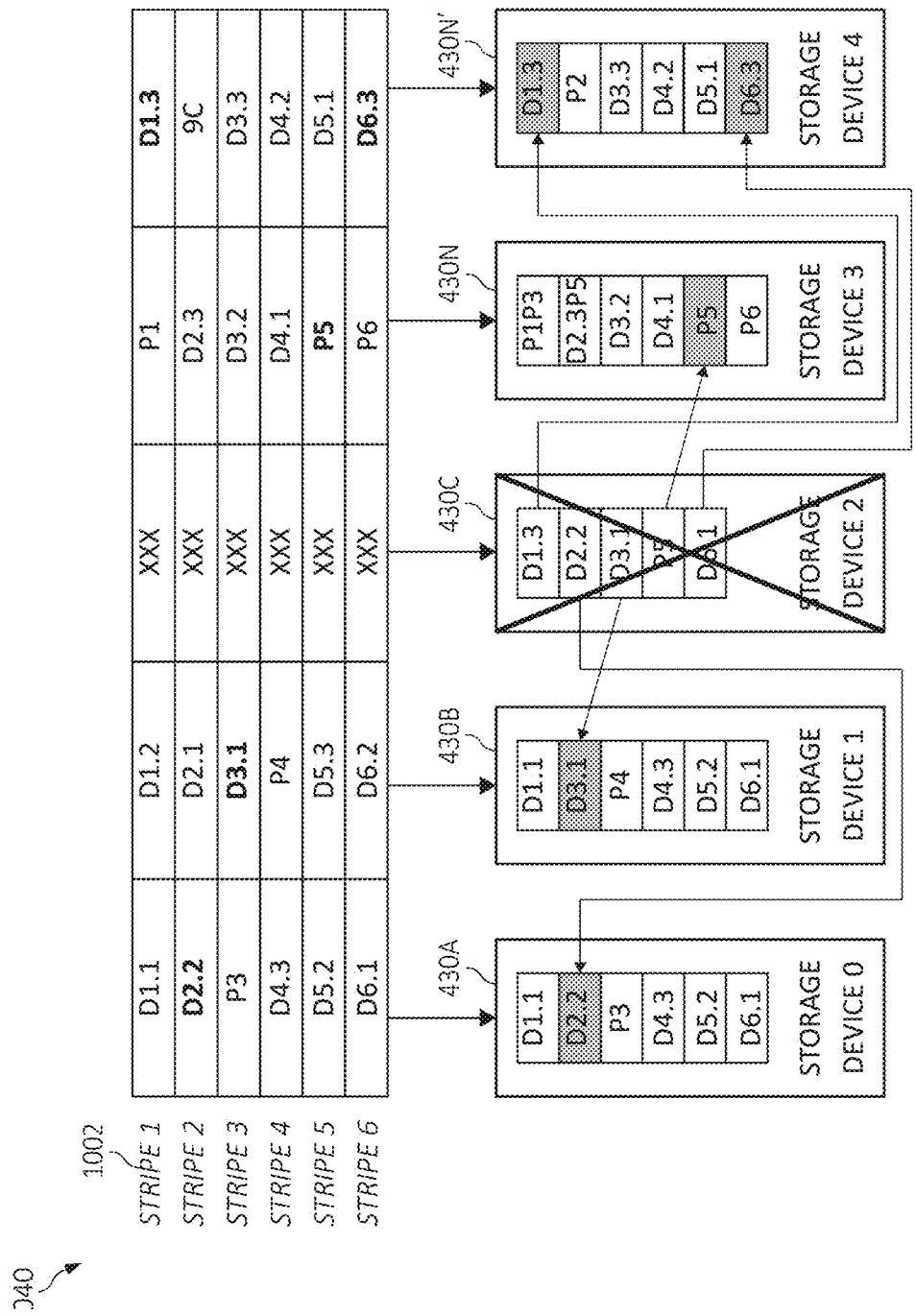

When a storage device 430A-N' fails, the data and parity information on the failed storage device is reconstructed from all other storage devices, and the reconstructed data is written at the empty portions in the logical data layout. In the RAID-5 configuration shown in RAID configuration 1040 of FIG. 10B, the storage device 2 (storage device 430C) has failed. Accordingly, due to the round-robin parity placement scheme used in this instance, the location of each reconstructed strip is implicitly defined. Unfortunately, any existing capacity imbalance is not mitigated using this scheme, and in fact may even deteriorate.

Figure 10C:
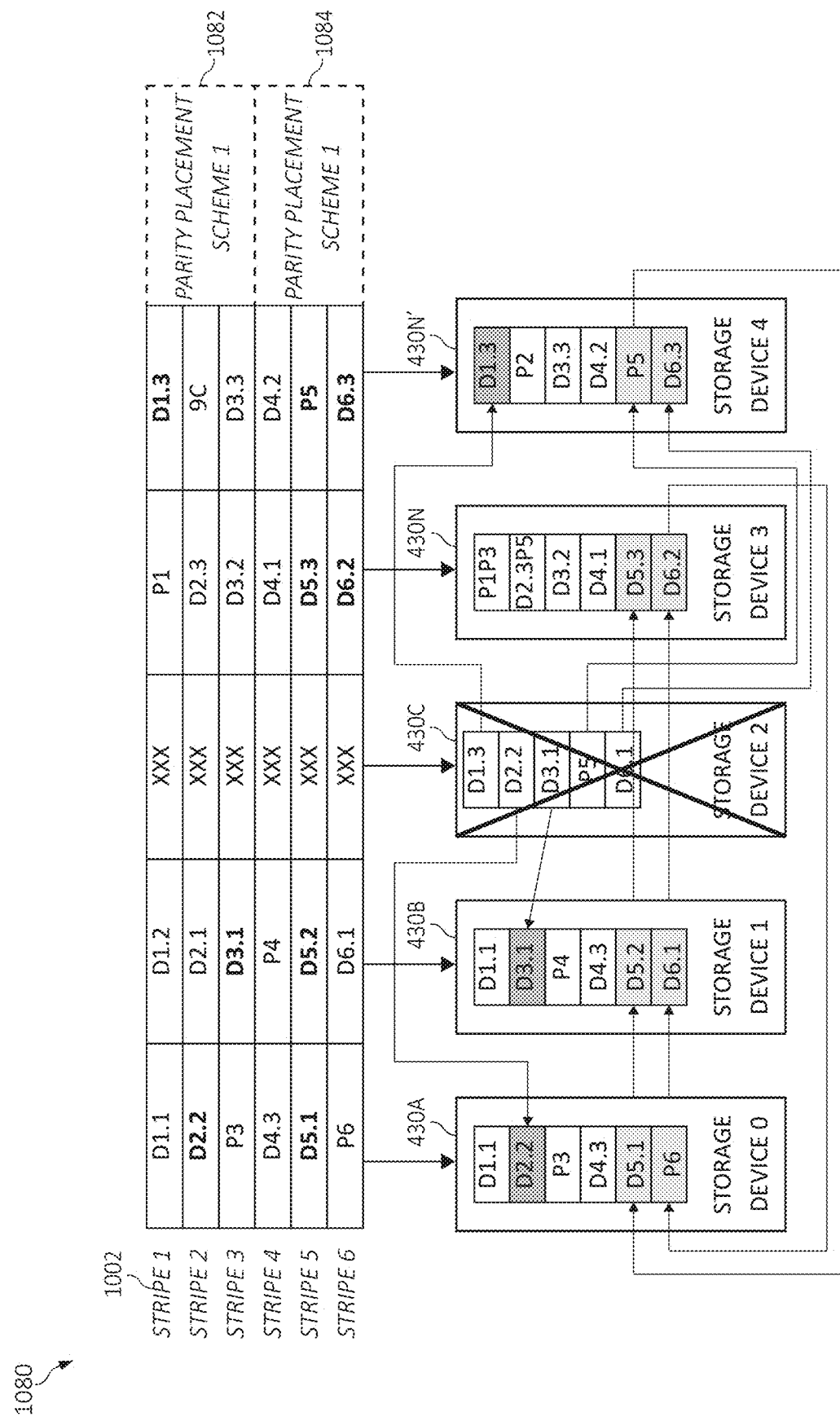

FIG. 10C thus illustrates a RAID configuration 1080 employing the data and parity information placement scheme upon a rebuild of a failed storage device according to aspects of the present invention. In the instant configuration 1080, two parity placement schemes are used: Scheme 1 (block 1082) is the default round-robin parity placement scheme. In scheme 2 (block 1084), the parity information is not placed on the storage device having the highest capacity used (storage device 3 or storage device 430N), but rather uses the round-robin placement scheme that skips placing parity on storage device 3. Stripe 4, as shown in the mapping 1002, remains unchanged as its parity information is not stored on storage device 3 (storage device 430N). The reconstructed parity strip P5 is written to the storage device 4 (storage device 430N'), thereby skipping storage device 3 (storage device 430N) and placing parity P5 on storage device 430N'. As the reconstructed parity strip P5 is not written to the empty location in the logical layout, all data strips of stripe 5 must be relocated accordingly. The placement of the parity strip P6 then follows the round-robin placement scheme with skipping and is stored on storage device 0 (storage device 430A). For stripe 5 and 6, all parity and data strips must be relocated.

Using this technique and as depicted in RAID configuration 1080, even as the used capacity increases on all good storage devices 430A, 430B, 430N, and 430N', the relative capacity increase of storage device 3 (storage device 430N) is lower relatively when compared to the other good storage devices, and therefore a balancing effect is achieved.

Additional Implementation Aspects

Using adaptive parity information placement with a distributed spare allows the reserved spare capacity on one (or a few) storage device(s) 430A-N' to be used up to a certain amount as long as enough spare capacity exists on all other storage devices 430A-N' for a rebuild. Upon performing a rebuild, those storage devices 430A-N' that were using some of their reserved spare capacity would not receive parity information data from the rebuild until the storage utilization is again rebalanced. In other words, the parity information may be withheld from those storage devices 430A-N' until the storage utilization across all storage devices 430A-N' is rebalanced to a certain extent.

In an additional aspect, the parity information and data placement of existing written data may be updated in the background. This process may, for example, be combined with an array-level read scrubber, some of which also recalculate and validate the parity information which further simplifies this technique.

In an additional aspect, a parity information placement scheme may be globally applied (i.e., to the entire RAID array) or selectively to particular ranges of the logical address space (i.e., certain LBA ranges). The capacity reporting may further be enhanced to include ranges of logical device address spaces (e.g., volumes, extents, etc.) within a particular storage device 430A-N rather than the reporting of the entire usage capacity of the storage device 430A-N itself.

In an additional aspect, upon the RAID controller 440 determining to switch to a new parity information placement scheme, the amount of data being relocated between storage devices 430A-N may be further reduced when the new parity information placement scheme is applied to writes on unmapped storage space only.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for adaptive placement of parity information within a Redundant Array of Independent Disks (RAID), by a RAID controller, comprising:
   periodically collecting, by the RAID controller, an indication of a current compression ratio achieved by each of a plurality of storage devices within the RAID;
   determining, by the RAID controller, a placement of data and the parity information within at least one of the plurality of storage devices according to at least one of a plurality of factors associated with the current compression ratio; and
   writing the data and the parity information by the RAID controller to the at least one of the plurality of storage devices according to the determined placement.

2. The method of claim 1, wherein the plurality of factors are selected from a list comprising the current compression ratio, a physical capacity usage of each of the plurality of storage devices, a current parity location of each stripe of a plurality of stripes within the RAID, and a current data location of each stripe.

3. The method of claim 2, further including maintaining, by the RAID controller, a first table recording the physical capacity usage of each of the plurality of storage devices and a second table indicating the current parity location of each stripe; wherein the RAID controller references the first table and the second table when determining the placement of the data and the parity information.

4. The method of claim 3, further including maintaining, by the RAID controller, a third table indicating the current data location of each stripe; wherein the RAID controller references the first table and the third table when determining the placement of the data and the parity information.

5. The method of claim 2, further including, to reduce a stored amount of metadata associated with the parity information, performing:
increasing a granularity of a size of each stripe to a predefined size; and
using at least one of a plurality of parity placement schemes which implicitly define the placement of the parity information on respective storage devices of the plurality of storage devices according to a weighted bias.

6. The method of claim 5, wherein:
the at least one of the plurality of parity placement schemes comprises storing the parity information using a round-robin model within each of the plurality of storage devices according to a predetermined compression ratio of the respective storage devices of the plurality of storage devices; and
the at least one of the parity placement schemes is globally applied to the RAID or selectively applied to particular ranges of logical address space; and further including:
determining, by the RAID controller, to switch from a first scheme to a second scheme of the plurality of parity placement schemes according to the predetermined compression ratio of the respective storage devices of the plurality of storage devices, wherein, subsequent to switching from the first scheme and the second scheme of the plurality of parity placement schemes, the second scheme of the plurality of parity placement schemes is applied to writes on unmapped storage space only.

7. The method of claim 1, wherein:
the placement of the data and the parity information is determined by the RAID controller upon receiving a write operation; or
the placement of the data and the parity information is determined by the RAID controller upon performing a RAID rebuild operation; wherein the RAID includes a distributed spare.

8. The method of claim 7, further including:
pursuant to the RAID rebuild operation, withholding the parity information from being stored on certain storage devices of the plurality of storage devices until the physical capacity usage is rebalanced among the plurality of storage devices; and
updating the data and the parity information of existing data within respective storage devices of the plurality of storage devices as a background operation using an array-level read scrubber.

9. A system for adaptive placement of parity information within a Redundant Array of Independent Disks (RAID), the system comprising:
a RAID controller executing instructions stored in a memory, wherein the RAID controller:
periodically collects an indication of a current compression ratio achieved by each of a plurality of storage devices within the RAID;
determines a placement of data and the parity information within at least one of the plurality of storage devices according to at least one of a plurality of factors associated with the current compression ratio; and
writes the data and the parity information to the at least one of the plurality of storage devices according to the determined placement.

10. The system of claim 9, wherein the plurality of factors are selected from a list comprising the current compression ratio, a physical capacity usage of each of the plurality of storage devices, a current parity location of each stripe of a plurality of stripes within the RAID, and a current data location of each stripe.

11. The system of claim 10, wherein the RAID controller maintains a first table recording the physical capacity usage of each of the plurality of storage devices and a second table indicating the current parity location of each stripe; wherein the RAID controller references the first table and the second table when determining the placement of the data and the parity information.

12. The system of claim 11, wherein the RAID controller maintains a third table indicating the current data location of each stripe; wherein the RAID controller references the first table and the third table when determining the placement of the data and the parity information.

13. The system of claim 10, wherein the RAID controller, to reduce a stored amount of metadata associated with the parity information, performs:
increasing a granularity of a size of each stripe to a predefined size; and
using at least one of a plurality of parity placement schemes which implicitly define the placement of the parity information on respective storage devices of the plurality of storage devices according to a weighted bias.

14. The system of claim 13, wherein:
the at least one of the plurality of parity placement schemes comprises storing the parity information using a round-robin model within each of the plurality of storage devices according to a predetermined compression ratio of the respective storage devices of the plurality of storage devices;
the at least one of the parity placement schemes is globally applied to the RAID or selectively applied to particular ranges of logical address space; and wherein the RAID controller:
determines to switch from a first scheme to a second scheme of the plurality of parity placement schemes according to the predetermined compression ratio of the respective storage devices of the plurality of storage devices, wherein, subsequent to switching from the first scheme and the second scheme of the plurality of parity placement schemes, the second scheme of the plurality of parity placement schemes is applied to writes on unmapped storage space only.

15. The system of claim 10, wherein:
the placement of the data and the parity information is determined by the RAID controller upon receiving a write operation; or
the placement of the data and the parity information is determined by the RAID controller upon performing a RAID rebuild operation; wherein the RAID includes a distributed spare.

16. The system of claim 15, wherein the RAID controller:
pursuant to the RAID rebuild operation, withholds the parity information from being stored on certain storage devices of the plurality of storage devices until the physical capacity usage is rebalanced among the plurality of storage devices; and
updates the data and the parity information of existing data within respective storage devices of the plurality of storage devices as a background operation using an array-level read scrubber.

17. A computer program product for adaptive placement of parity information within a Redundant Array of Independent Disks (RAID), by a RAID controller, the computer program product embodied on a non-transitory computer-readable storage medium having computer-readable program code portions stored therein, the computer-readable program code portions comprising:
an executable portion that periodically collects, by the RAID controller, an indication of a current compression ratio achieved by each of a plurality of storage devices within the RAID;
an executable portion that determines, by the RAID controller, a placement of data and the parity information within at least one of the plurality of storage devices according to at least one of a plurality of factors associated with the current compression ratio; and
an executable portion that writes the data and the parity information by the RAID controller to the at least one of the plurality of storage devices according to the determined placement.

18. The computer program product of claim 17, wherein the plurality of factors are selected from a list comprising the current compression ratio, a physical capacity usage of each of the plurality of storage devices, a current parity location of each stripe of a plurality of stripes within the RAID, and a current data location of each stripe.

19. The computer program product of claim 18, further including an executable portion that maintains, by the RAID controller, a first table recording the physical capacity usage of each of the plurality of storage devices and a second table indicating the current parity location of each stripe; wherein the RAID controller references the first table and the second table when determining the placement of the data and the parity information.

20. The computer program product of claim 19, further including an executable portion that maintains, by the RAID controller, a third table indicating the current data location of each stripe; wherein the RAID controller references the first table and the third table when determining the placement of the data and the parity information.

21. The computer program product of claim 18, further including an executable portion that, to reduce a stored amount of metadata associated with the parity information, performs:
increasing a granularity of a size of each stripe to a predefined size; and
using at least one of a plurality of parity placement schemes which implicitly define the placement of the parity information on respective storage devices of the plurality of storage devices according to a weighted bias.

22. The computer program product of claim 21, wherein:
the at least one of the plurality of parity placement schemes comprises storing the parity information using a round-robin model within each of the plurality of storage devices according to a predetermined compression ratio of the respective storage devices of the plurality of storage devices;
the at least one of the parity placement schemes is globally applied to the RAID or selectively applied to particular ranges of logical address space; and further including an executable portion that:
determines, by the RAID controller, to switch from a first scheme to a second scheme of the plurality of parity placement schemes according to the predetermined compression ratio of the respective storage devices of the plurality of storage devices, wherein, subsequent to switching from the first scheme and the second scheme of the plurality of parity placement schemes, the second scheme of the plurality of parity placement schemes is applied to writes on unmapped storage space only.

23. The computer program product of claim 17, wherein:
the placement of the data and the parity information is determined by the RAID controller upon receiving a write operation; or
the placement of the data and the parity information is determined by the RAID controller upon performing a RAID rebuild operation; wherein the RAID includes a distributed spare.

24. The computer program product of claim 23, further including an executable portion that:
pursuant to the RAID rebuild operation, withholds the parity information from being stored on certain storage devices of the plurality of storage devices until the physical capacity usage is rebalanced among the plurality of storage devices; and
updates the data and the parity information of existing data within respective storage devices of the plurality of storage devices as a background operation using an array-level read scrubber.

25. A method for adaptive placement of parity information within a Redundant Array of Independent Disks (RAID) within a plurality of storage devices, wherein each of the plurality of storage devices independently performs compression operations on data stored therein, by a RAID controller, the method comprising:
upon receiving a write operation, determining, by the RAID controller, a location to place data and the parity information within at least one of the plurality of storage devices according to an indication of a current compression ratio achieved by each of a plurality of storage devices within the RAID;
writing update data and the parity information by the RAID controller to the at least one of the plurality of storage devices according to the determined location; and
updating, by the RAID controller, the determined location of the placement of the data and the parity information within a parity placement table.

* * * * *